United States Patent [19]

Goldsmith

[11] 4,190,314

[45] Feb. 26, 1980

[54] MICROSCOPE AND MICROSCOPE SLIDE FOR CYTOLOGICAL ANALYSIS

[76] Inventor: Stephen Goldsmith, 104 Lee Ave., Babylon, N.Y. 11702

[21] Appl. No.: 868,535

[22] Filed: Jan. 11, 1978

Related U.S. Application Data

[63] Continuation of Ser. No. 657,096, Feb. 11, 1976, which is a continuation of Ser. No. 378,984, Jul. 13, 1973, abandoned.

[51] Int. Cl.$^2$ ............................................. G02B 21/34
[52] U.S. Cl. ................................................... 350/94
[58] Field of Search ................................. 350/90–95, 350/81; 356/244, 39, 40, 171, 102, 164; 33/111, 125 A, 1 B, 1 C, 1 BB; 353/41

[56] References Cited

U.S. PATENT DOCUMENTS

| | | | |
|---|---|---|---|
| 1,647,865 | 11/1927 | Hausser | 350/94 |
| 2,488,351 | 11/1949 | Turrettini | 33/111 |
| 3,481,659 | 12/1969 | Rosenberg | 356/244 |

OTHER PUBLICATIONS

Moser, Walter, "Accurate . . ." *Micrtecnic*, vol. XIV, No. 2, Apr. 1960, pp. 39–44.

Kniat, K. S., Western Electric Tech. Dig. No. 25, Jan. 1972, pp. 51–52.

*Primary Examiner*—Jon W. Henry
*Attorney, Agent, or Firm*—Gerald L. Price

[57] ABSTRACT

A microscope slide for cytological analysis of the type where it is extremely important that the presence of a small number of cancer cells present in a smear be detected. A plurality of spaced parallel lines are permanently placed on the slide with the space between each successive pair of lines defining a reference plane. The spacing between each pair of lines corresponds to the field of view produced by the particular microscope lens and eyepiece being utilized so that when a viewer makes a viewing pass across each successive reference plane that the smear is located in, by keeping the lines continuously in the field of view during each pass, the entire area of the smear will be viewed.

11 Claims, 4 Drawing Figures

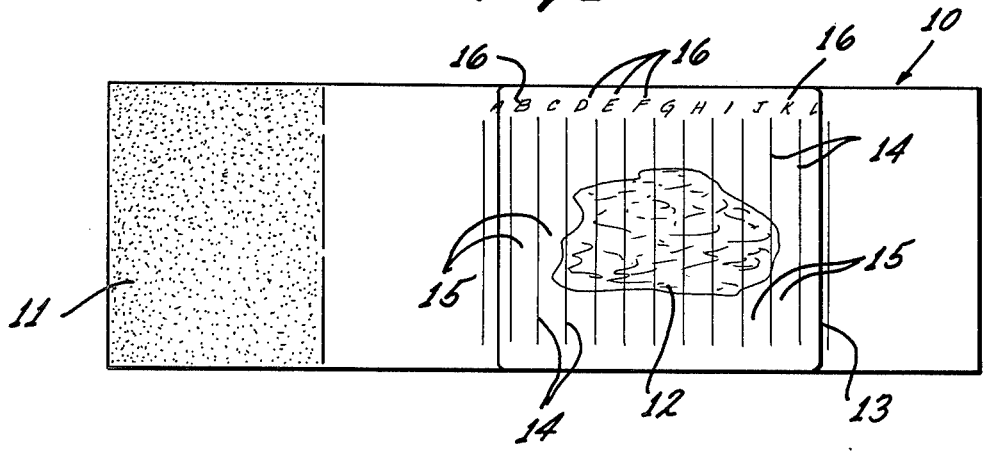
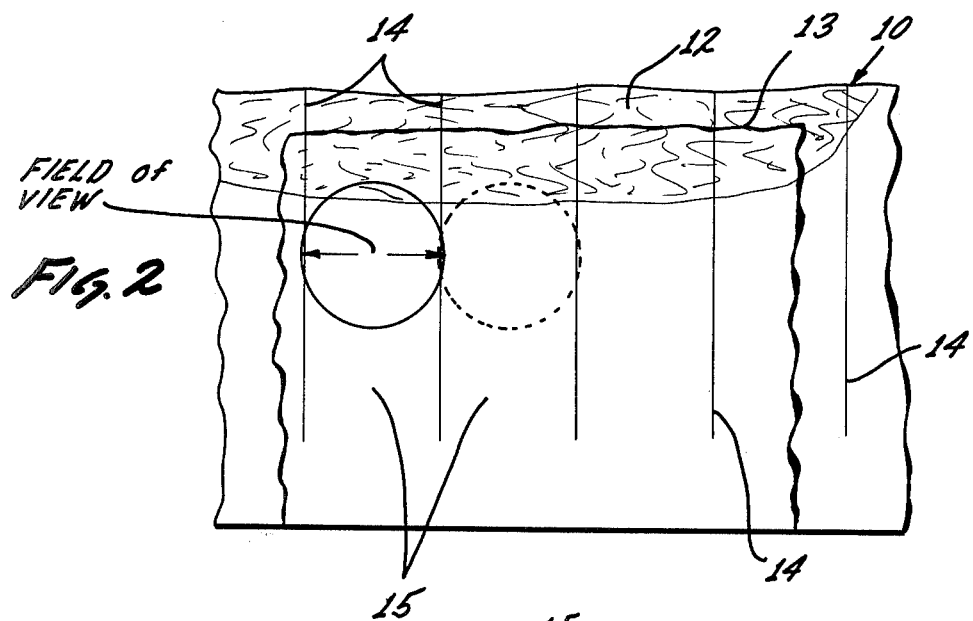
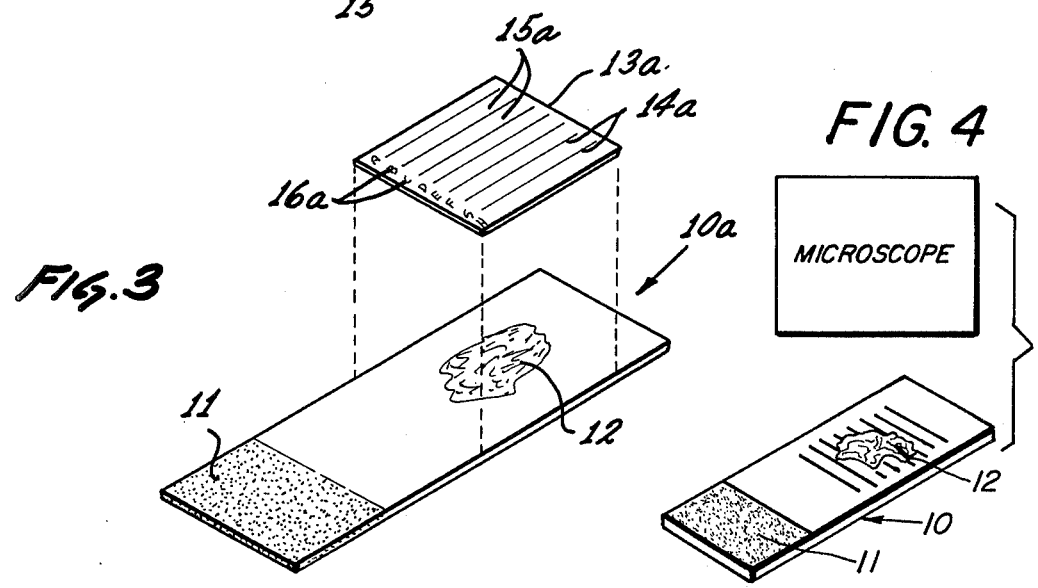

MICROSCOPE AND MICROSCOPE SLIDE FOR CYTOLOGICAL ANALYSIS

This is a continuation of application Ser. No. 657,096, filed Feb. 11, 1976, which is a continuation of application Ser. No. 378,984, filed July 13, 1973, now abandoned.

BACKGROUND OF THE INVENTION

The present invention relates generally to microscope slides for cytological analysis, and more particularly, to an improved slide which ensures that all of the cells present in the smear to be analyzed will be screened.

The standard procedure for the early detection of uterine cancer is the "Pap test." This test was named after Dr. George N. Papanicolaou who discovered that there were certain pathologic cells correlated with uterine cancer and these cells could be dectected when the cancer was at an early stage by examining through a microscope a slide on which a vaginal smear or preferably cervical scrapings had been placed and stained.

In carrying out the "Pap test" a conventional glass microscope slide is prepared with a smear made up of scrapings and secretion from the cervical area utilizing any one of the methods well known and universally accepted by the medical profession.

The smear on the prepared slide is then viewed through a microscope by a trained individual such as a cytologist who endeavors to view the entire smear covered by the cover slip on the slide to determine if any cancer cells are present in the smear. Inasmuch as the number of malignant cells which are exfoliated greatly increases as the uterine cancer enters advance stages, the early stages of the cancer where detection is important requires extremely accurate viewing of the slide since there could be only one or several malignant cells present in the entire smear.

The procedure conventionally utilized to view "Pap smears" to detect the presence of any malignant cells is for the viewer to start at one outer boundary of the smear under the cover slip of the slide and by operating the stage of the microscope, make a plurality of successive parallel passes either lengthwise or widthwise with respect to the slide, with each successive pass encompassing the adjacent field of view as best determined by the viewer with the field of view being dependent on the power of the lens and eyepiece of the microscope.

While the above procedure is generally satisfactory, there are several inherent factors which affect accuracy which in turn could result in a lone cancer cell being undetected. This would be at a time when the patient's cancer is at a very early stage and the rate of cure is very high.

The major factor affecting accuracy in the above procedure is the dependency on the eye of the viewer to judge when the stage of the microscope has been advanced so that the next pass will cover the field of view adjacent to that which has just been viewed. Although an insufficient movement will not affect accuracy since an overlapping will take place and a portion of the field viewed in the previous pass will be re-viewed, and excessive overlap will greatly increase the time required to screen a slide and will hasten the fatigue of the viewer. If an excessive movement is made, there may be a narrow strip between the successive passes that is not viewed in which a malignant cell could conceivably be located.

In addition to loss of accuracy by the user depending on his eye for guidance to the adjacent field of view, the slide could possibly be slightly dislodged during viewing or one of the knobs on the microscope stage accidently moved, either of which possibly resulting in a critical area of the smear remaining unviewed.

SUMMARY OF THE INVENTION

Accordingly, it is the general aim of the present invention to provide a new and improved microscope slide for examining cytology smears where it is critical that the presence of any malignant cells be ascertained which is far superior from the standpoint of accuracy and reliability than has heretofore been known in the prior art.

It is another object of the present invention to provide a slide for cytological studies which can be screened in a far less amount of time and with a far greater degree of accuracy than that presently available.

It is still another aim of the present invention to provide a slide for cytological studies which accurately designates each adjacent field of view so that a viewer making a plurality of successive passes will be sure that the entire smear has been viewed.

BRIEF DESCRIPTION OF THE DRAWINGS

The above stated and other objects and advantages of the instant invention will readily appear from the following description taken in conjunction with the accompanying drawings in which:

FIG. 1 is a top plan view, of an exemplary slide prepared with a Pap-smear and embodying the features of the present invention;

FIG. 2 is a pictorial representation of a portion of a Pap-smear on a slide embodying the features of the present invention viewed through a microscope; and FIG. 3 is a top perspective view of an alternative slide and cover plate embodying the features of the present invention.

FIG. 4 is a schematic representation of a microscope having a field of view of a predetermined diameter being utilized for viewing a cytological smear on a slide constructed in accordance with one exemplary embodiment of the present invention.

While the present invention is susceptible of various modifications and alternative constructions, the illustrative embodiments shown in the drawings will herein be described in detail. It should be understood, however, that it is not intended to limit the invention to the particular forms disclosed, but, on the contrary, the intention is to cover all modifications, equivalents and alternative constructions falling within the spirit and scope of the invention as expressed in the appended claims.

DESCRIPTION OF THE PREFERRED EMBODIMENT

Referring now to FIG. 1, a microscope slide of conventional overall dimension such as 25 mm by 75 mm generally indicated at 10, is illustrated. The slide which is clear and preferably made of glass further includes an etched or frosted portion 11 for applying identification to the slide by use of a writing instrument or adhesive label. The slide 10 has been prepared with a Pap-smear 12 utilizing conventional and well known techniques that are presently employed which in turn has been covered with a conventional cover slip 13 of a size such as 24 mm by 30 mm to protect the smear 12.

In accordance with the primary aspect of the present invention, provision is made to ensure that in making a plurality of parallel viewing passes across the smear 12, that each successive pass will encompass the entire field of view adjacent to the field of view of the previous viewing pass to eliminate overlap and more importantly, any portion of the smear 12 left unviewed.

To accomplish this, a plurality of spaced parallel reference lines 14 are permanently applied across the clear portion of the slide 10 by any conventional method such as etching or printing and to either the upper or lower surface of the slide. The distance between each adjacent pair of parallel lines 14 is accurately measured to correspond to the diameter of the field of view obtained when utilizing conventional combinations of microscope lenses and eye pieces. For example, the most widely utilized combination in cytology is a 10× lens and a 15× eye piece which provides a field of view of a diameter of approximately 1 mm. By accurately spacing each successive line 14 1 mm apart from the adjacent lines, the space 15 between any two adjacent lines 14 will define a reference plane which will be entirely viewed by a viewer making a longitudinal visual traversal of the plane utilizing the aforestated 10× lens and 15× eye piece combination. Accordingly, when a viewer aligns the field of view between two adjacent lines 14 in a manner as depicted in FIG. 2, these lines appear in the field of view at the opposite edges thereof. The viewer, by maintaining the lines 14 at the opposite edge of the field of view throughout the entire longitudinal viewing traversal or pass, will be assured that the entire area on the smear in the reference plane between these two adjacent lines has been scanned and viewed. At the end of each viewing pass, the viewer, by advancing the entire slide so as to align the field of view in the next adjacent space 15 or reference plane between lines 14 as depicted in broken lines in FIG. 2, relocates the field of view so that the next viewing pass will scan the space 15 next to the space 15 previously scanned without omitting any area of the smear 12 therebetween.

As set forth above, the present invention provides a slide with a plurality of parallel and adjacent pre-determined spaces 15 or reference planes with the width of each corresponding to the field of view provided by the particular lens and eye piece combination employed by the viewer. By employing the instant invention, the entire area of the smear is viewed thereby eliminating the major cause of a viewer performing a cytology study of a slide failing to detect a cancer cell on the slide when very few are present.

While the present invention is illustrated in FIG. 1 with the lines 14 running parallel to the width of the slide 10, the present invention also contemplates having the lines 14 run parallel to the length of the slide 10 depending upon the particular preference of the viewer.

As shown in FIG. 1, indicia 16 such as numbers or letters can be provided to identify each plane or space 15 so that a particular area of the smear 12 can be quickly relocated at any time.

Another important advantage of the present invention is that a microscope with a stage that is unknowingly worn or out of adjustment can still be utilized without fear of missing cells since as long as the field of view is maintained in each plane or space 15, during each successive viewing pass, the entire area of the smear will be viewed.

Turning next to FIG. 3, an alternative embodiment of the instant invention is depicted utilizing the same reference numbers hereinbefore described in connection with the embodiment of FIGS. 1 and 2, but here having the letter "a" combined therewith. In this embodiment, a conventional type of slide 10a is utilized, and the parallel reference lines 14a which define the space or reference planes 15a are provided on a cover plate 13a as is indicia 16a for identifying the respective planes or spaces 15a.

Having described my invention, I claim:

1. In combination with a microscope having a field of view of a predetermined diameter, a microscope slide comprising a thin elongated flat generally transparent strip having means for accurately designating adjacent fields of view and comprising a plurality of visible adjacent spaced-apart parallel lines formed on and extending over almost all of a flat surface of said strip, each of two adjacent equidistantly spaced-apart lines of said plurality of lines defining one of a plurality of uninterrupted scanning spaces having a width substantially equal to the diameter of the field of view of the microscope viewing device for viewing a cytological smear on the slide wherein said means enables a viewer by visually making reference to adjacent lines defining each of said plurality of said scanning spaces to view the entire area of a smear by successive contiguous viewing scans of said scanning spaces, the spacing between each of two adjacent spaced-apart lines being approximately 1 mm, whereby a viewer making a viewing pass along all of said plurality of scanning spaces overlying a smear is ensured of detecting even a single malignant cell in a smear.

2. The microscope slide set forth in claim 1 wherein said lines extend parallel to the width thereof.

3. The microscope slide set forth in claim 1 wherein said lines extend parallel to the length thereof.

4. The microscope slide set forth in claim 1 wherein said lines are in the form of rough frosted surfaces.

5. The microscope slide set forth in claim 1 further including integral indicia on said strip for identifying each scanning space.

6. In combination with a microscope having a field of view of a predetermined diameter, a microscope cover plate comprising a thin flat generally transparent strip having means for accurately designating adjacent fields of view and comprising a plurality of visible adjacent spaced-apart parallel lines formed on and extending over almost all of a flat surface of said strip, each of two adjacent equidistantly spaced-apart lines of said plurality of lines defining one of a plurality of uninterrupted scanning spaces having a width substantially equal to the diameter of the field of view of the microscope viewing device for viewing a cytological smear on a slide covered by said cover plate wherein said means enables a viewer by visually making reference to adjacent lines defining each of said plurality of said scanning spaces to view the entire area of a smear by successive contiguous viewing scans of said scanning spaces, the spacing between each of two adjacent spaced-apart lines being approximately 1 mm, whereby a viewer making a viewing pass along all of said plurality of scanning spaces overlying a smear is ensured of detecting even a single malignant cell in a smear.

7. The cover plate set forth in claim 6 wherein said lines extend parallel to the width thereof.

8. The cover plate set forth in claim 6 wherein said lines extend parallel to the length thereof.

9. The cover plate set forth in claim 6 wherein said lines are in the form of rough frosted surfaces.

10. The cover plate set forth in claim 6 further including integral indicia on said strip for identifying each scanning space.

11. The microscope slide set forth in claim 1 wherein the area on said transparent strip over which said lines extend is substantially greater than the area of a conventional size microscope slide cover slip.

* * * * *